United States Patent [19]
O'Donnell

[11] Patent Number: 5,855,985
[45] Date of Patent: Jan. 5, 1999

[54] NON-PLANAR FLEXIBLE ARTICLES HAVING IMPROVED MECHANICAL SERVICE, AND METHODS OF MAKING

[75] Inventor: Hugh Joseph O'Donnell, Cincinnati, Ohio

[73] Assignee: The Proctor & Gamble Company, Cincinnati, Ohio

[21] Appl. No.: 670,641

[22] Filed: Jun. 22, 1996

[51] Int. Cl.$^6$ .................. B32B 3/28; B32B 5/00
[52] U.S. Cl. .............. 428/174; 428/181; 254/405; 254/479; 105/18
[58] Field of Search ............... 105/18; 428/174, 428/179, 181, 409, 405, 460, 479, 459, 212, 543; 156/272.2, 273.3; 427/457, 508

[56] References Cited

U.S. PATENT DOCUMENTS

| | | | |
|---|---|---|---|
| 2,906,678 | 9/1959 | Lawton et al. | 204/154 |
| 4,582,656 | 4/1986 | Hoffmann | 264/22 |
| 4,661,396 | 4/1987 | Andorf et al. | 428/217 |
| 4,860,665 | 8/1989 | Schmidt | 105/18 |
| 5,456,186 | 10/1995 | Hubner | 105/18 |

*Primary Examiner*—Donald Loney
*Attorney, Agent, or Firm*—J. M. (Mark) Gilbreth; Robert W. Strozier; Gilbreth & Strozier, P.C.

[57] ABSTRACT

Non-planar thermoplastic article having a flexible portion suitable for use in an aggressive chemical environment, with the flexible portion is an irradiated thermoplastic consisting of polyethylene, ethylene methyl acrylate, ethylene ethyl acrylate, or ethylene vinyl acetate copolymers. Such articles can be made by forming the article and then irradiating, or alternatively by radiating the thermoplastic and then forming the article.

20 Claims, 5 Drawing Sheets

FIG. 5

NON-PLANAR FLEXIBLE ARTICLES HAVING IMPROVED MECHANICAL SERVICE, AND METHODS OF MAKING

BACKGROUND OF THE INVENTION

1. Field of the Invention

The present invention relates to molding compositions, to methods of making such compositions, to products made from said compositions, and to methods of making said products. In another aspect, the present invention relates to irradiated molding compositions, to methods of making such compositions, to products made from said compositions, and to methods of making said products. In even another aspect, the present invention relates to molding compositions having improved environmental stress cracking resistance and environmental fatigue resistance, to methods of making such compositions, to products made from said compositions, and to methods of making said products

2. Description of the Related Art

Stress cracking or environmental stress cracking (ESC) is the brittle failure of plastic parts when simultaneously subjected to static mechanical stress and chemical exposure. In a similar fashion, environmental fatigue (EF) is the failure or cracking of a part when simultaneously subjected to dynamic mechanical stress and chemical exposure. Insufficient environmental stress cracking resistance or environmental fatigue resistance leads to greatly shortened service life of a part.

Flexible molded articles are used in various packaging, dispensing, pumping, footwear, or protective mechanical boot applications. Ideally, these flexible molded articles will retain essentially the same mechanical properties during the desired service life. However, in a less than ideal world, especially mechanical service in the presence of aggressive chemical environments, such exposure can attack or alter these flexible molded articles and hence the performance or service life of such articles.

It is desired that these flexible molded articles withstand, without cracking, mechanical cycling during exposure to a wide range of chemicals. These articles preferably retain dimensional stability after long periods in a compressed state. Dimensional stability permits the springing back of said articles toward their natural uncompressed position as opposed to becoming set to the compressed shape. Additionally, when these articles are held under compression in contact with chemicals and for an extended period of time, it is desired that they withstand environmental stress cracking that could create cracks or openings through the wall of the part and/or alter the mechanical properties.

It is desirable that the flexible molded articles be suitable for service in a wide range of chemical environments. However, designing a suitable polymeric material for such a flexible molded article useful in a wide range of chemical environments has proven difficult.

For example, numerous elastomeric materials can be used to make flexible spring-like moldings that satisfy mechanical design criteria in the absence of an aggressive chemical environment, or in one particular type of aggressive chemical environment. For example, a material that is suitable for an acidic solution can be ill-suited for an alkaline or oxidizing medium; a material that is resistant to stress cracking in a dilute alcoholic solution can crack after the addition of a perfume, for example, a terpene-based perfume. More specifically, thermoplastic elastomers such as polyesters and polyamides provide spring-like behavior in an article. However, these materials lack chemical resistance to extreme pH conditions because of chemical degradation. Thermoplastic urethane elastomers provide a wide range of mechanical properties and could satisfy the mechanical design requirements of a flexible spring-like device. However, these materials can degrade from exposure to alkaline solutions. Resins such as poly(vinyl chloride) or propylene and styrene-ethylene-butylene-styrene block copolymer blends, when highly plasticized, exhibit greater chemical resistance but lack either the compression set resistance or dynamic response required for a flexible spring-like device. Low crystallinity or low density polyethylene or ethylene copolymers typically provide favorable moduli and good chemical resistance. However, these materials can often undergo environmental stress cracking unless very high molecular weight resins, that are ill-suited for injection molding, are used. Thus, selection of a material for a flexible spring-like article for use in a wide variety of chemical environments, preferably aqueous solutions or emulsions, becomes difficult.

Alternatively, if several materials are chosen for particular types of chemical service, then fabrication costs can be large. For example, because each material can exhibit unique shrinkage during molding, achieving dimensional tolerances often requires the fabrication of individual molds that are tailored to the shrinkage of each material. Accordingly, use of several molds to accommodate the shrinkage of a variety of thermoplastic materials for the production of the same part but for service in different fluids leads to higher fabrication costs. It is desired to minimize this cost by use of a few materials as possible, ideally, by the use of one material.

One type of application of particular interest, is the use of a flexible spring-like device, such as a bellows, in chemical service. Techniques for fabricating a bellows are known in the art. For example, U.S. Pat. No. 5,236,656, issued Aug. 17, 1993 to Nakajima discloses a method of injection blow molding synthetic resin bellows. U.S. Pat. No. 5,439,178, issued Aug. 8, 1995 to Peterson, discloses a pump having a bellows which can be constructed from polyolefins such as polypropylene, low density polyethylene, ethylene vinyl acetate, rubber and thermoplastic elastomers. World Patent No. WO 88/06088 to Cheynol et al., published Aug. 25, 1988, discloses a process and apparatus for the manufacture of a protective bellows for a transmission device, in which rough molded bellows are injected during a primary stage into a first mold, then, in a second mold, the rough molding is blown rib by rib, or by groups of ribs, until the required form of the bellows is achieved.

However, these patents do not address the fabrication of a bellows suitable for use in a wide variety of chemical environments.

Specifically, for a flexible spring-like device in chemical service, an enhancement of one or more material properties is required for any material to satisfy the requirements of such service.

Methods to enhance the environmental stress cracking resistance of, for example, polyethylene and ethylene copolymers are known. These methods include crosslinking of polyethylene by peroxides or irradiation. Crosslinking with peroxides has disadvantages such as increased viscosity, localized scorching, and health concerns. Crosslinking by irradiation avoids these disadvantages.

Irradiation of thermoplastics is known in the art as shown by the following prior art references.

U.S. Pat. No. 2,855,517, issued Oct. 7, 1958, to Rainer et al., discloses irradiation of polyethylene above its melting point into a clear, transparent liquid, followed by quenching to preserve its transparency and thus produce transparent polyethylene.

Lanza, V. L., in "Effect of radiation on polyethylene", Modern Plastics, vol. 34, No. 11, pp. 129–132, 134 and 136 (1957), discloses use of high energy electrons, gamma rays, or atomic pile radiation to cross-link polyethylene, resulting in greater insolubility, changes in tensile properties, increase in the environmental stress cracking resistance, and better stability at higher temperatures.

U.S. Pat. No. 2,906,678, issued Sep. 29, 1959 to Lawton et al., discloses a process for irradiating polyethylene at elevated temperatures to enhance crosslinking efficiency.

Olander, John, in "A guide to radiation equipment", Modern Plastics, vol. 38, No. 10, pp. 105–106, 109, 110, 113, 116, 119, 190 and 192 (1961), discloses use of high velocity electrons, X-rays, and gamma rays in the crosslinking of polymeric materials, which in the case of polyethylene, can result in increased temperature and solvent resistance, increased tensile strength, increased melt viscosity, decreased elongation, higher resistance to deformation under load, and improved environmental stress cracking.

U.S. Pat. No. 3,102,303, issued Sep. 3, 1963 to Lainson, discloses an apparatus for irradiation of plastics, in which extruded polyethylene pipe is subjected to controlled ultraviolet radiation during extrusion to cause crosslinking.

U.S. Pat. No. 3,130,139, issued Apr. 21, 1964 to Harper et al., discloses polyolefin articles containing uniform dispersions of carbon black in polyolefins made by subjecting the polymer to ionizing radiation prior to its admixture with the carbon black, which articles can be irradiated to further improve chemical and physical properties.

U.S. Pat. No. 3,563,870, issued Feb. 16, 1971 to Tung et al., discloses a process for producing injection molded parts, in which prior to molding the olefin polymer particles are exposed to high energy radiation ranging from about 0.05 to about 0.3 megarads. Tung further teaches that above 0.3 megarads the melt extensibility is decreased.

U.S. Pat. No. 3,734,843, issued May 22, 1973 to Tubbs, discloses the initial melt index of ethylene/vinyl acetate copolymers can be substantially lowered by treating the copolymers with high energy ionizing radiation of high dose rates up to a critical dose, i.e., point at which gel is formed. Tubbs further discloses that for polymers having an initial melt index of less than 50, a dose of 5 megarads will cause significant gel, and for polymers having an initial melt index of 10 or less, a critical dose will rarely exceed 2 megarads.

U.S. Pat. No. 3,773,870, issued Nov. 20, 1973 to Spillers, discloses that a substantially uniform dosage of ionization can by applied to tubing if the tubing is completely flattened in the zone of radiation. This is accomplished by passing the tubing over a flat roller directly under the electron beam generator, or alternatively, by passing the tubing through a pair of vertically spaced flat plats arranged directly under the electron beam generator.

U.S. Pat. No. 3,783,115, issued Jan. 1, 1974 to Zeppenfeld, discloses a process for preparing cross-linked polyethylene fiber by irradiating a polyethylene sheet material with a high does rate and thereafter heat tempering the irradiated sheet material.

U.S. Pat. No. 4,049,757, issued Sep. 20, 1977 to Kammel et al., discloses the production of shaped bodies by extrusion, injection molding or extrusion pressing of a crosslinkable polymer, which shaped bodies are then subjected to high-energy radiation to crosslink the polymer.

U.S. Pat. No. 4,264,661, issued Apr. 28, 1981 to Brandolf, discloses a process for manufacturing an irradiation crosslinked molded article. The process includes molding a thermoplastic to form an article which does not crosslink under the molding conditions, removing the article from the mold with a separable portion of the mold being retained by the molded article, irradiating the article to crosslink it, and finally, removing the separable portion from the article.

U.S. Pat. No. 4,367,186, issued Jan. 4, 1983 to Adelmann et al., discloses a process of preparing molded articles from crosslinkable aromatic thermoplastic polycarbonate by first subjecting the polycarbonate to irradiation with UV rays or other high energy rays thereby causing crosslinking of about 5 to about 50 weight percent. The polycarbonate is extruded in a known manner and irradiated, either immediately as the extruded strand or in the form of granules, and are then made into any desired shape by extrusion or injection molding.

U.S. Pat. No. 4,582,656, issued Apr. 15, 1986 to Hoffman, discloses the use of additives for polyolefins to prevent the occurrence of undesirable accumulations and discharges of electrical charge concentrations and/or to suppress or eliminate the undesirable foaming of polyolefin molded articles during irradiation.

U.S. Pat. No. 5,061,415, issued Oct. 29, 1991 to Depcik, discloses a process for improving the quality of injection molded parts by utilizing a high frequency electromagnetic field and application of pressure in sunk spots in critical regions, which for partially crystalline material, at an operating temperature of more than 10° C. above the melting point, and which for amorphous material, at an operating temperature more than 30° C. above the glass transition temperature.

JP 098850, published Dec. 27, 1991, discloses production of imide silicone-type polymer articles by molding imide silicone-type polymer into the desired shape and irradiating it with an electron beam in the presence of crosslinking aids, to produce sheets, pipes and insulated wires having improved heat distortion resistance and solvent resistance.

However, in spite of these advancements in the above prior art of numerous irradiation methods for enhancing some properties of thermoplastics, none of the above prior art references disclose or suggest how to enhance the environmental fatigue life for a flexible product in aggressive chemical service.

Thus, there is still a need for a material useful in aggressive chemical service.

There is another need in the art for a method of making such a material that is useful in aggressive chemical service.

There is even another need in the art for flexible articles useful in aggressive chemical service.

There is still another need in the art for a method of making flexible articles useful in aggressive chemical service.

These and other needs in the art will become apparent to those of skill in the art upon review of this specification, including its drawings and claims.

SUMMARY OF THE INVENTION

It is an object of the present invention to provide for a material useful in aggressive chemical service.

It is another object of the present invention to provide for a method of making such a material that is useful in aggressive chemical service.

It is even another object of the present invention to provide for flexible articles useful in aggressive chemical service.

It is still another object of the present invention to provide for a method of making flexible articles useful in aggressive chemical service.

These and other objects of the present invention will become apparent to those of skill in the art upon review of this specification, including its drawings and claims.

According to one embodiment of the present invention, there is provided a process for producing a treated non-planar article, having improved mechanical service in an aggressive chemical environment. The process includes forming a thermoplastic into a first non-planar article having a flexible portion. The process also includes exposing the first non-planar article to an amount of radiate energy to form a treated thermoplastic. The exposure to the radiate energy should be such that the temperature of the thermoplastic during irradiation does not exceed its melting point temperature, while being sufficient to improve the mechanical service of the article in an aggressive chemical environment.

The improvement in mechanical service can be an improvement in the compression set index of the treated non-planar article while exposed to the aggressive chemical environment, as compared to the compression set index of the first untreated non-planar article in the same aggressive chemical environment.

The improvement in mechanical service can also be an improvement in the resistance to environmental stress cracking or environmental fatigue of the treated non-planar article while exposed to the aggressive chemical environment, as compared to the environmental stress cracking or environmental fatigue, respectively, of the first untreated thermoplastic article in the same aggressive chemical environment, while maintaining the mechanical properties, such as the compression set index, of the untreated thermoplastic.

The improvement in mechanical service can also be an improvement both in the compression set index, and in the environmental stress cracking or environmental fatigue of the non-planar article while exposed to the aggressive chemical environment, as compared to compression set index and environmental stress cracking or environmental fatigue of the first untreated non-planar article in the same aggressive chemical environment.

In even another embodiment, the thermoplastic can first be irradiated, optionally ground into particles, and then formed into a desired shape. The ground particles can be mixed with unirradiated thermoplastic, which mixture is then formed into a desired shape (which shape can optionally be further irradiated).

In another embodiment, the thermoplastic can first be irradiated and then molded into an article of a desired shape, so long as the melt viscosity of the irradiated thermoplastic remains low enough to permit molding.

In yet another embodiment there is provided a non-planar article comprising a flexible portion which comprises an irradiated thermoplastic.

In still another embodiment, there is provided a non-planar article comprising a potential energy section. This potential energy storage section comprises an irradiated thermoplastic, with the section is suitable for cyclic movement between a position of lower potential energy, and another position of higher potential energy.

According to another embodiment of the present invention, there is provided an irradiated thermoplastic having improved mechanical service properties for use in aggressive chemical environments.

DETAILED DESCRIPTION OF THE INVENTION

The following definitions of terms are used in this specification.

Aggressive Chemical Environment is any vapor, liquid or solid environment which can adversely diminish the chemical or physical properties or nature of a thermoplastic article into which the article is placed, or in which the article is in contact in service.

Figure 1:
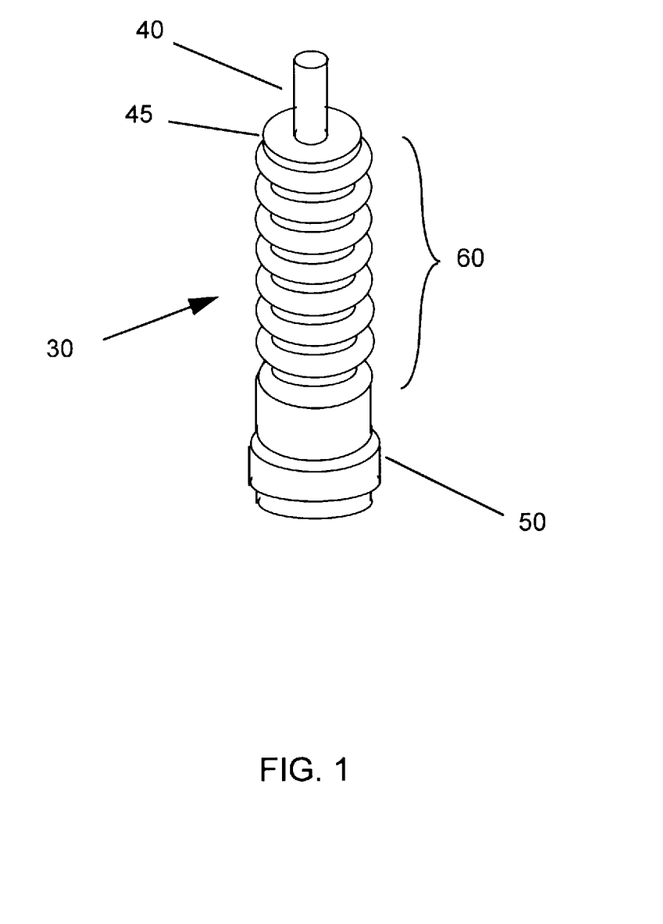
FIG. 1 a perspective of a bellows 30 of Example 1

Compression Set Testing is a test wherein a flexible portion of an article, such as a standard bellows as shown in FIG. 1, is compressed by a Force F1 from a first position wherein the flexible portion has a length L1, to a second position wherein the flexible portion has a compressed length L2, and is held at the compressed length L2 for a period of time and temperature in a fixed aggressive chemical environment. After the period of time, the flexible portion is removed from the environment and permitted to expand free of strain to a third position wherein the flexible portion has a length L3. Thereafter, a force F2 is applied to the article to compress the flexible portion from the third position (L3) to the second position (L2). Alternatively, the article can be returned to the compressed second position (length L2) and placed into the environment for additional periods of time.

Compression Set Resistance is the resistance of the flexible portion of an article such as a bellows to become permanently set at a fixed temperature into or approaching the second position after the Compression Set Testing.

Compression Force Residual (CFR) is the ratio of the force F2 to the force F1, or F2/F1, wherein F1 and F2 are as defined by the Compression Set Testing.

Compression Force Ratio is the ratio of the Compression Force Residual (CFR) of an irradiated article to the CFR of a non-irradiated or non-treated article.

Compression Set Index (CSI) is the ratio of the difference between length L1 and length L3, to the difference between length L1 and length L2, times 100, wherein lengths L1, L2 and L3 are as defined by the Compression Set Testing.

Compression Set Ratio (CSR) is the ratio of the Compression Set Index (CSI) of the irradiated flexible portion of a thermoplastic article to the Compression Set Index (CSI) of the flexible portion of the thermoplastic article before irradiation.

Environmental Stress Cracking Resistance (ESCR) is the resistance of a flexible portion of a thermoplastic article to developing cracks in the thermoplastic flexible portion as a result of holding or restraining the flexible portion in a compressed or strained state while exposed to an aggressive chemical environment.

Environmental Fatigue Resistance (EFR) is the resistance of a flexible portion of a thermoplastic article to developing cracks in the thermoplastic flexible portion as a result of prolonged cyclic loading of the flexible portion from a first position free of strain prior to said testing (of length L1) to a compressed second position (of said length L2), while exposed to an aggressive chemical environment.

In the practice of the present invention, an article can be modified to permit its service in a wide variety of chemical environments, preferably, aqueous based environments. In the practice of the present invention, the chemical environment of the end application is first determined, and then an appropriate thermoplastic selected for that environment. The material of the article is chosen from thermoplastic resins that resist chemical attack in an aggressive chemical environment, that resist excessive swelling by the fluid of the aggressive chemical environment, that are crosslinkable with irradiation and that have low moduli. The polymer is preferably selected to have a melt index suitable to permit use of injection molding manufacturing methods.

Materials that are suitable for use in the practice of the present invention are generally crosslinkable by irradiation. It is preferred that these materials undergo more crosslinking reactions rather than chain scission (degradation through bond rupture leading to lower molecular weight) reactions from irradiation.

The thermoplastics materials utilized in the present invention generally provide mechanical service in aggressive chemical environments after irradiation and are generally flexible or can be modified to permit flexibility at application temperatures. Accordingly, these irradiated thermoplastic articles can offer mechanical and chemical advantages over the uncrosslinked articles as specified by this invention.

Furthermore, the irradiated thermoplastic articles are generally intractable. These articles substantially resist flowing when heated above the melting point. Application of compressive forces such as 10,000 lbs force from heated plates to said articles once heated above the melting point still does not create significant flow of said articles. Contrarily, non-irradiated or gel-free thermoplastic articles can be formed into thin films when heated above the melting point and compressed between heated plates with 10,000 lbs force.

The present invention enables an improvement in either the physical properties or nature, or the chemical properties or nature, or both, in a flexible portion of a thermoplastic article which has been treated with radiate energy. In one embodiment, an article can be made from a untreated thermoplastic which exhibits good environmental stress cracking or environmental fatigue in aggressive chemical environment, but which has poor to moderate physical properties or nature in the aggressive chemical environment, such as compression set index. As an example, a bellows made from an ethylene vinyl acetate copolymer (EVA) containing 28 weight % vinyl acetate would offer good EFR but poor CSR. Treatment of the thermoplastic with radiate energy in accordance with the present invention provides improved physical properties, such as improved compression set index, to the treated thermoplastic article.

In another embodiment, an article can be made from a untreated thermoplastic which exhibits good physical properties or nature, such as compression set index, in an aggressive chemical environment, but which has poor to moderate environmental stress cracking or environmental fatigue in the aggressive chemical environment. As an example, a bellows made from an ethylene vinyl acetate copolymer (EVA) containing 9 weight % vinyl acetate would exhibit improved CSR but poor EFR. Treatment of the formed thermoplastic article with radiate energy in accordance with the present invention provides improved environmental stress cracking or environmental fatigue properties to the treated thermoplastic article, compared to the untreated thermoplastic. Environmental stress cracking is generally improved with less radiate energy dosage than it requires to improve compression set resistance.

In yet another embodiment, an article can be made from an untreated thermoplastic which exhibits poor to moderate environmental stress cracking or environmental fatigue in the aggressive chemical environment, as well as poor to moderate physical properties or nature, such as compression set index. Such a thermoplastic can be selected for cost or other reasons. As an example, a bellows made from an ethylene vinyl acetate copolymer (EVA) containing 19 weight % vinyl acetate would exhibit moderate EFR and CSR, especially at temperatures at or above 100° F. Treatment of the formed thermoplastic article with radiate energy in accordance with the present invention provides improved environmental stress cracking or environmental fatigue properties, as well as improved physical properties or nature, such as compression set index, to the treated thermoplastic article.

In an alternative embodiment of this embodiment, the thermoplastic can first be irradiated, optionally ground into particles of less than about 10 microns in size, and then formed into a desired shape. In even another embodiment, the thermoplastic can first be irradiated and then formed into a desired shape, which shape can be further irradiated. In still another embodiment, the thermoplastic can first be irradiated, then mixed with unirradiated thermoplastic, which mixture is then formed into a desired shape (which shape can optionally be further irradiated).

Examples of such thermoplastic materials which can be utilized in the present invention include but are not limited to poly alpha-olefins, copolymers of one or more alpha-olefins, copolymers of an alpha-olefin and an ethylenically unsaturated carboxylic ester, poly(vinyl chloride), poly (dimethyl siloxane), natural rubber, polybutadiene, and butadiene-styrene copolymer, and blends of the above.

The alpha-olefins utilized in the present invention generally comprise at least 2 carbon atoms. Preferably, the alpha-olefin utilized in the copolymers of the present invention comprise from about 2 to about 8 carbon atoms, more preferably from about 2 to about 4 carbon atoms, and most preferably from about 2 to about 3 carbon atoms. Preferable examples of suitable alpha-olefins include ethylene, propylene and butylene. Most preferably, the alpha-olefin utilized in the present invention is ethylene.

Polyethylenes useful in the present invention are generally selected according to the desired use to have a high elongation at yield, high elongation at yield at elevated temperatures, suitable modulus, resistance to stress relaxation, and suitable dynamic response. Generally polyethylenes useful in the present invention will have a density less than about 0.94 g/cm$^3$, and will generally include those known commercially as low density, very low density, or linear low density polyethylenes. Methods of making such polyethylenes are well known, and include high pressure processes, Ziegler-Natta catalyst processes, or single cite catalyst processes such as metallocene catalyst processes, any of which can be utilized.

The ethylenically unsaturated carboxylic ester monomers utilized in the copolymers of the present invention are selected from the group of vinyl esters of saturated carboxylic acids and alkyl esters of an alpha, beta-ethylenically unsaturated carboxylic acids. Examples of suitable ester monomers include alkyl acrylates, non-limiting examples of which include, methyl acrylate, ethyl acrylate, butyl acrylate, isobutyl acrylate and methyl methacrylate. Other non-limiting examples of suitable ester monomers include, diethyl maleate, dimethyl fumarate, vinyl acetate, vinyl propionate and the like. Preferably the copolymer contains one of the following ester monomers: methyl acrylate, ethyl acrylate and vinyl acetate. Most preferably, the copolymer is an ethylene vinyl acetate copolymer, ethylene ethylacrylate copolymer, or ethylene methylacrylate copolymer.

The preferred materials for use in the present invention are copolymers of olefins and either vinyl or alkyl esters. More preferred materials are copolymers of ethylene and either vinyl or alkyl esters.

The copolymers of olefins and vinyl or alkyl esters utilized in the present invention generally comprise in the range of about 1 to about 40 weight percent ester. Preferably, the copolymers of olefin and esters utilized in the present invention comprise in the range of about 5 to about 30 weight percent ester, most preferably in the range of about 10 to about 30 weight percent ester.

Blends of copolymers of olefins and vinyl or alkyl esters, having different percentages of esters, can be utilized in the present invention. Such blends are preferably blends of ethylene vinyl acetate (EVA) copolymers having different contents of vinyl acetate. For example, a 60:40 weight % blend of a first EVA having 19% by weight vinyl acetate and a second EVA having 28 wt. % vinyl acetate. As another example, a 30:70 wt. % blend of 9 wt. % (vinyl acetate) EVA and 28 wt. % (vinyl acetate) EVA.

The melt flow index of the material utilized in the present invention must be suitable to allow sufficient filling of the selected mold shapes and to withstand operating conditions of forming process. For example, for a spring-like flexible article such as a bellows, it is preferred to use a resin having a medium melt flow index (MFI) in the range of about 3 to about 40. More preferably, the MFI is in the range of about 5 and about 35, and most preferably in the range of about 7 to about 30. The melt flow index is defined in ASTM test method D 1238. This range of MFI permits shaping of the article with such methods as injection molding or injection blow molding.

After treatment by the methods of the present invention, resins suitable for making a spring-like flexible article (such as a bellows) generally have a Young's modulus of at least 2000 psi. Preferably, the resins utilized will have a Young's modulus after treatment of less than about 100,000 psi. More preferably, resins have a Young's modulus after treatment in the range of about 2,000 to about 50,000 psi for flexible articles as described by this invention. Even more preferably, the resins have a Young's modulus after treatment in the range of about 2,000 to about 35,000 psi. Most preferably, the resins have a Young's modulus after treatment in the range of about 3,000 to about 12,000 psi.

Any high energy radiation suitable to impart the desired properties can be utilized in the present invention. Suitable high energy radiation includes, ultraviolet light, high energy electrons, neutrons, protons, and deuterons, as well as X-rays, beta-rays, and gamma-rays.

Devices for generating radiate energy are well known, and any device suitable in the practice of the present invention can be utilized. Preferably, energy sources utilized in the present invention are gamma rays as generated by Cobalt 60, or high energy electrons as generated by electron accelerators. More preferably, high energy electrons as generated by electron accelerators are utilized in the practice of the present invention.

Ultraviolet light can be conveniently provided utilizing commercially available UV lamps, for example Philips HTQ 4 or 7, Hanovia lamps or others. Electron beam energy can be conveniently provided by commercially available electron beam curing units, for example a Dynamitron direct electron accelerator available from Radiation Dynamics of Edgewood, N.Y.

The radiation dose levels suitable for use in the present invention which will provide improved performance and/or service life will vary from thermoplastic material to material. In general, it is desirable that the irradiation process not cause any undue distortion of the formed article. This is generally accomplished by making sure that the temperature of the irradiated material does not exceed its melting point during the irradiation process. The suitable radiation dosage levels can be estimated depending upon the G values for crosslinking of the material. The G values are defined as the number of molecules reacted per 100 eV of energy absorbed. The G values for crosslinking (or scission) refer to the number of molecules undergoing crosslinking (or bond rupture) per 100 eV of absorbed energy.

For example, the crosslink (scission) G values for polyethylene and natural rubber are 3.0 molecules undergoing crosslinking (0.88 molecules undergoing bond rupture) and 1.1 molecules undergoing crosslinking (0.22 molecules undergoing bond rupture) per 100 eV absorbed, respectively. For these materials, crosslinking occurs preferentially over chain scission reactions. For polyethylene, a dosage in the range of about 2 to about 40 Mrad is suitable to impart the desired properties. Preferably, for polyethylene, a dosage in the range of about 3 to about 35 Mrad, and most preferably in the range of about 3 to about 30 Mrad is utilized. In contrast, for natural rubber, a dose 2.7 times higher than that for polyethylene would be required.

The radiation dose level required for a desired level of performance can change based on additives in the polymer. It is known that crosslinking enhancers and crosslinking retarders modify the required dose level. Additionally, it is known that conditions such as temperature or atmosphere can modify the required dose level. These should all be taken into consideration in the practice of the present invention.

The irradiation levels utilized must be suitable to impart desired properties to the molding. For example, for ethylene-vinyl acetate copolymer, irradiation levels from 1 to 35 Mrad are used to impart desired properties to the molding. For the same polymer, doses between 5 and 25 Mrad are preferred for increased compression set resistance, with the most preferred dosage being in the range of about 5 to about 15 Mrad.

At its upper level, any irradiation dose absorbed by the article should not cause undue or substantial permanent dimensional distortions or undesired mechanical property changes. Heating of an article to the melting point, or with some materials to the softening point, can lead to permanent dimensional distortions or undesired mechanical properties changes. Thus, for an article that can be heated above its thermoplastic softening point temperature without undue or substantial permanent dimensional distortions or undesired mechanical property changes, it is generally heated to a temperature less than its melting point temperature, preferably to a temperature between its melting point temperature and its softening point temperature. Most preferably the thermoplastic materials utilized in the present invention are not heated above their softening point temperatures.

A high radiation dose can be delivered without excessively heating the article either by use of a low radiate flux such as obtained using gamma rays or by using multiple passes of incremental dosing from high flux sources such as electron beam radiation. The article must be permitted to cool, or be cooled, prior to absorption of an additional radiation dose if the article's temperature approaches a melting or softening point. The sum of all dosages received by an article since the creation of the molded part is termed the accumulated dose. Provided that melting of crystals or softening or melting of the article does not occur, then the performance of the article should be directly related to the accumulated dose and exhibit little to no relationship to the number of irradiation sessions, or to the level of radiate flux.

A measurement of the effectiveness of radiation to provide cross-linking of the material, and thus a measure of the relative amount of cross-linking of the material, can be determined by measuring the amount of gel by ASTM Standard D2765-90.

While fabrication of the irradiated polymer of the present invention has been illustrated mainly with respect to injection molding, it should be understood that the polymer should also find use in a broad range of polymer fabrication processes, including injection blow molding, stamp molding, extrusion, pultrusion, pressing, blow molding, rotational molding, and the like.

In the practice of the present invention, the benefits obtained from radiation-induced crosslinking are several-fold. First, the environmental stress cracking resistance (ESCR) is significantly improved. Second, the environmental fatigue resistance (EFR) is also significantly improved. Third, with sufficient radiation dosage, the compression set resistance (CSR) is significantly improved.

For an irradiated article of the present invention undergoing compression set testing in an aggressive chemical environment at a temperature of interest, the ratio of the compression force residual after (for example) 16 weeks will generally be improved, as compared to the compression force residual of a non-irradiated article. The improvement of the compression force ratio resulting from irradiation is preferably at least about 5 percent, more preferably at least by about 20 percent, even more preferably at least by about 50 percent, and most preferably at least by about 200 percent. In a similar way, the improvement of the compression set index resulting from irradiation is preferably at least about 5 percent, more preferably at least by about 10 percent, even more preferably at least by about 15 percent, and most preferably at least by about 20 percent.

The materials of the present invention are useful for making flexible molded articles for various packaging, dispensing, pumping, or protective mechanical boot applications.

The materials of the present invention will find utility in the making of products subject to static or cyclic loading conditions in an aggressive chemical environment, for example, bellows, diaphragms, and boots. Such products have a flexible, resilient, spring-like or potential energy storage portion, which can be subject to static or cyclic loading. Such a portion can comprise one or more folds, pleats, coils, bends, curves, helixes, bows, twists, or the like, to form a section which functions as a potential energy storage section, for example a pleated section as with a bellows, or a coiled section as with a spring.

The articles of the present invention are generally non-planar having a potential energy storage section, and undergoing cyclic movement of the potential energy storage section between a position of lower potential energy, and another position of higher potential energy.

An article of the present invention is the form of a bellows is particularly useful as a means of pumping and dispensing fluids from containers, such as bottles, cans, and the like. Bellows and bellows pumps and dispensers in general are well known in the art. Techniques for fabricating a bellows and use of a bellows as a pump or dispensing means for a container are known in the art. For example, U.S. Pat. No. 5,236,656, issued Aug. 17, 1993 to Nakajima discloses a method of injection blow molding synthetic resin bellows, and U.S. Pat. No. 5,439,178, issued Aug. 8, 1995 to Peterson, discloses a pump having a bellows which can be constructed from polyolefins such as polypropylene, low density polyethylene, ethylene vinyl acetate, rubber and thermoplastic elastomers. Non-limiting products that can be dispensed using such bellows pump include liquid hair care compositions such as shampoos and conditioners, cosmetic and skin care products, and liquid dishcare, hard surface and laundry detergent compositions. Such products can come in a variety of liquid forms including, but not limited to, lotions, gels, oils, aqueous liquids, emulsions and dispersions In the practice of the present invention, there can be utilized, as desired and/or necessary, accelerators to advance the formation of cross-linking of the polymer, or inhibitors to diminish the formation of cross-linking of the polymer. Examples of accelerators include polyfunctional unsaturated monomers such as diethylene glycol diacrylate or dipropargyl maleate; examples of inhibitors include antioxidants such as butylated hydroxytoluene.

In the practice of the present invention, there can also be utilized, as desired and/or necessary, antioxidants, cross-linking agents, stabilizers, ultraviolet ray absorbers, lubricants, foaming agents, antistatic agents, organic and inorganic flame retardants, plasticizers, slip agents, dyes, pigments, talc, calcium carbonate, carbon black, mica, glass fibers, carbon fibers, aramid resin, asbestos, as well as other fillers as are known in the art.

EXAMPLES

The invention is further illustrated by the following examples:

Example 1

An ethylene-co-vinyl acetate copolymer having a MFI of 30 and containing 19% by weight vinyl acetate (UE652-059 made by Quantum Chemical Co.) was injection molded into one or more pleated bellows as shown in FIG. 1.

Figure 2:
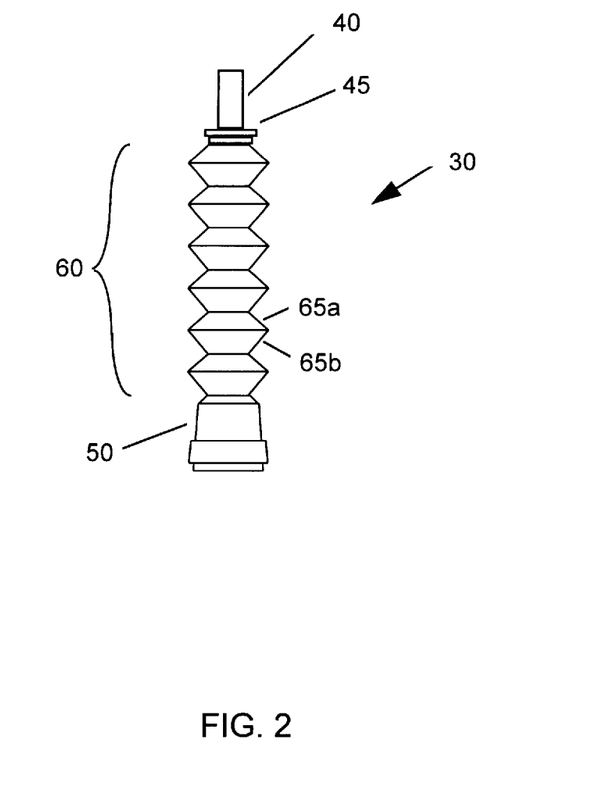
FIG. 2 is side view of bellows 30 of FIG. 1.

The bellows 30 illustrated in FIG. 1 and FIG. 2 were made in an automatic unit cavity mold. The bellows 30 has a top portion 40 having a shoulder 45, a bottom portion 50, and a flexible portion 60 intermediate to the top portion 40 and the bottom portion 50, the flexible portion 60 consisting a plurality of pleats 65a and 65b.

The injection molding machine was a Engel 200 ton tie-barless machine, model EC88, made in Canada. The range of conditions used for manufacture of these bellows are specified in Table 1-A.

TABLE 1-A

Typical Injection Molding Parameters

| Parameter | Setting | Units |
| --- | --- | --- |
| Melt Temperature | 195–225 | °C. |
| Screw RPM | 200–400 | rpm |
| Back pressure | 20–60 | psi |
| Injection Time | 0.5–0.7 | s |
| Hold Pressure | 5000–8000 | psi |
| Hold Time | 2–6 | s |
| Cooling Time | 8–12 | s |
| Mold Temperature | 90 | °C. |

The bellows formed above are equilibrated to room temperature and are irradiated (E-Beam Services, Inc. of Cranbury N.J.) with a total exposure of 25 Mrad utilizing a Dynamitron direct electron accelerator (available from Radiation Dynamics of Edgewood, N.Y.) The amount of radiate energy absorbed for each pass of the article through the accelerator is controlled at between 1–2.5 Mrad, for as many passes through the accelerator to achieve the total of 25 Mrad. The rate of irradiation exposure and the frequency of passage of the article through the accelerator is selected to minimize (preferably avoid) heating the article above the melting point of the thermoplastic.

a) Environmental Fatigue Resistance (EFR)

Figure 4A:
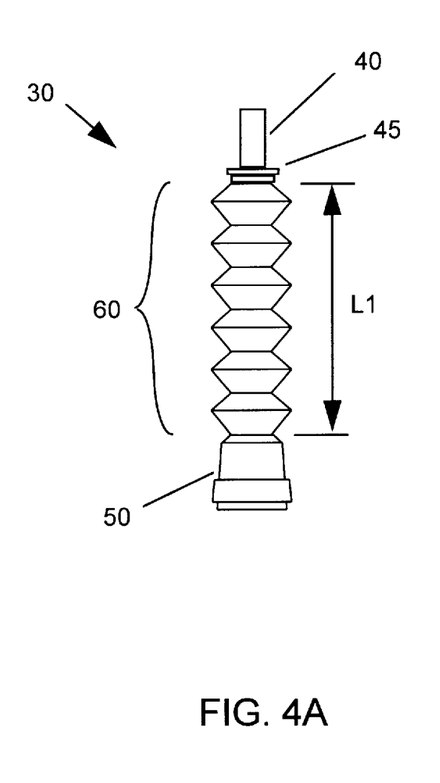
FIGS. 4A and 4B are a schematic representation of bellows 30 undergoing environmental stress cracking resistance testing or environmental fatigue testing.
Figure 4B:
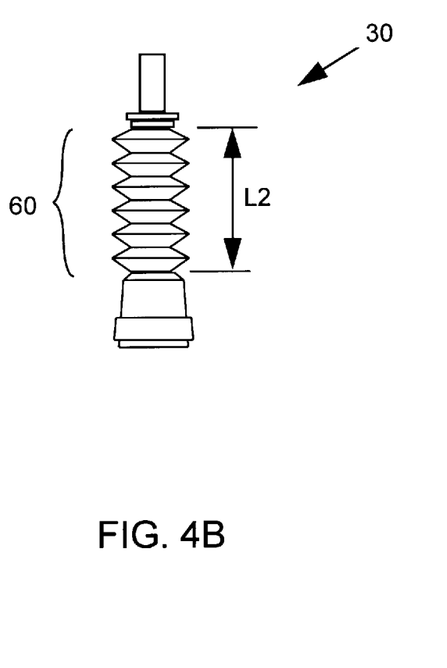
Figure 5:
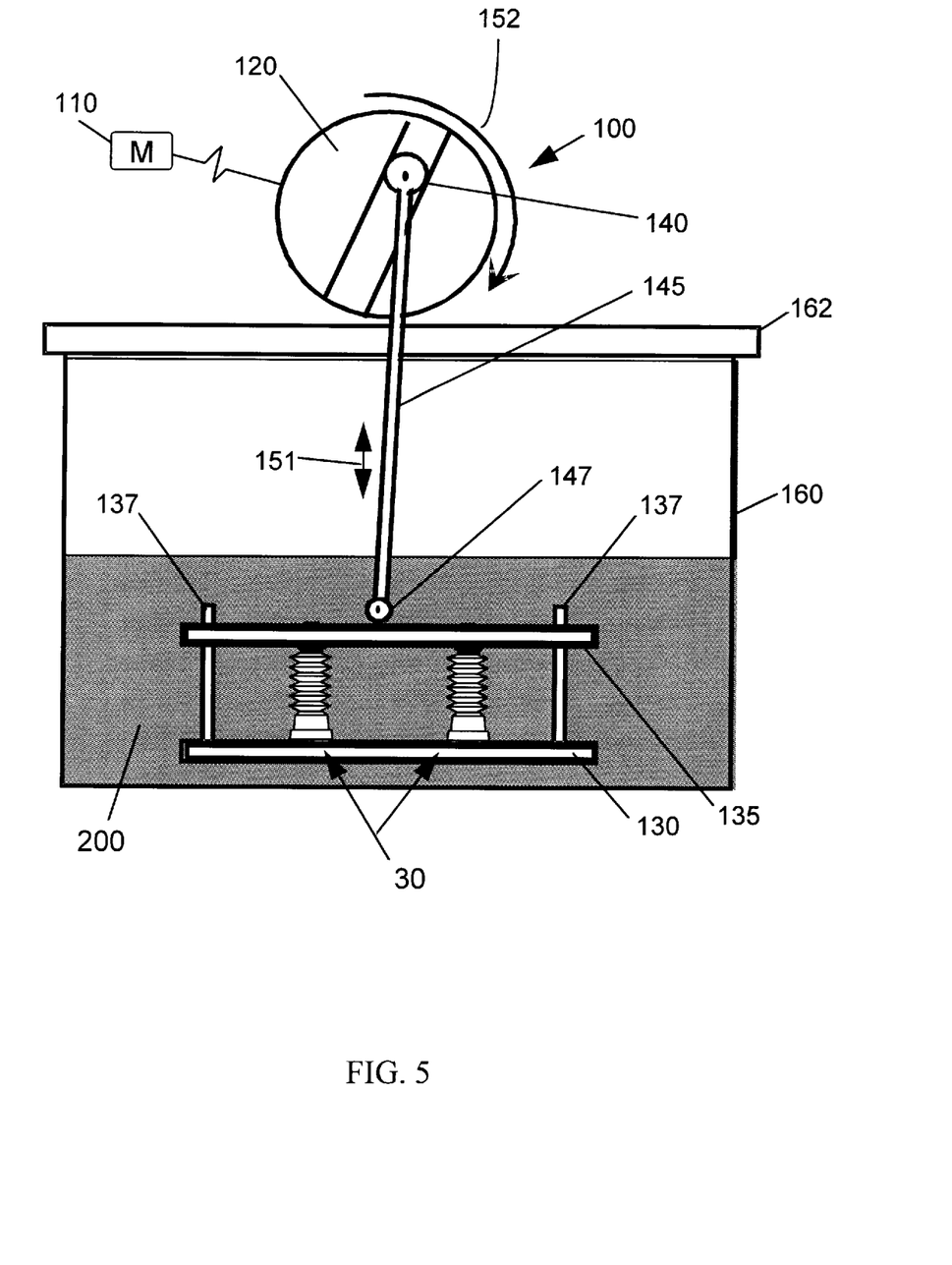
FIG. 5 is a schematic representation of a bellows 30 undergoing environmental fatigue testing.

Referring to FIGS. 4A and 4B, environmental fatigue resistance testing was performed by placing the bellows 30 into a test solution 200 of FIG. 5 consisting of Vidal Sassoon™ Straight Hair Shampoo, sold in Japan by Procter & Gamble Far East, Inc. (June 1995), and cycling the flexible portion 60 of the bellows from a first position near full height (where the flexible portion has a length L1) to a second position near the end of a full stroke (where the flexible portion has a length L2). For the bellows shown in FIG. 1, the bottom portion 50 is substantially incompressible relative to the flexible portion 60, and is held stationary. The shoulder 45 of the bellows is cycled at 2 cycles per second from the first position wherein length L1 is 1.64 inches (4.166 cm), down to a second position wherein the length L2 is 1.14 inches (2.896 cm).

The cycling is effected by a mechanical apparatus 100 as shown in FIG. 5, with motor 110 driving flywheel 120 as shown by direction arrow 152 to create a sinusoidal stroke pattern. Bellows 30 are held between top retaining plate 135 and bottom retaining plate 130, which are all submerged in aggressive chemical 200 in tank 160 having lid 162. Retaining plate 135 is moved toward and away from bottom retaining plate 130, guided by retaining plate guides 137. Pushrod 145 is connected to flywheel 120 by adjustable linkage 140, and to top retaining plate 135 by linkage 147. The rotation of flywheel 120 in the direction of arrow 152 as shown, drives pushrod 145 up and down as represented by arrow 151, which in turn moves retaining plates 135 relative to retaining plate 130, thus repeatedly compressing bellows 30. After cycling 10,000 times, the bellows is inspected for cracks and holes, and is graded to characterize the extent of cracks and holes (indicating a failure of the bellows) using the Environmental Fatigue Resistance Testing Index shown in Table 1-B. The adjustable linkage 140 is adjusted to create a 0.5 inch (1.27 cm) stroke in push rod 145 and top plate 135. The bottom plate 130 is raised to ensure nearly full compression of the flexible portion of the bellows.

TABLE 1-B

| Index | Description |
|---|---|
| 1 | No cracks |
| 2 | Less than 10 small cracks |
| 3 | No holes but more than 10 cracks |
| 4 | One or more holes |
| 5 | Opening connecting two or more holes |

An environmental failure index based on the average of the indices of four bellows is reported in Table 1-C.

b) Compression Force Residual (CFR) and Compression Set Ratio (CSR)

Figure 3A:
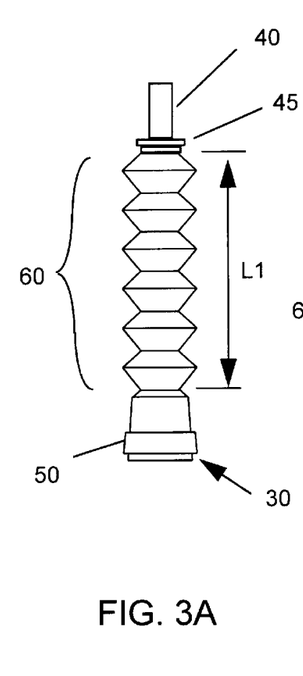
FIGS. 3A, 3B and 3C are a schematic representation of bellows 30 undergoing compression set testing.
Figure 3B:
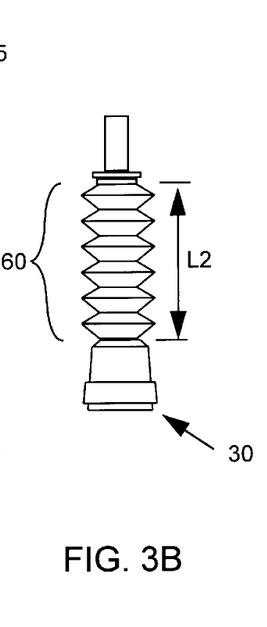
Figure 3C:
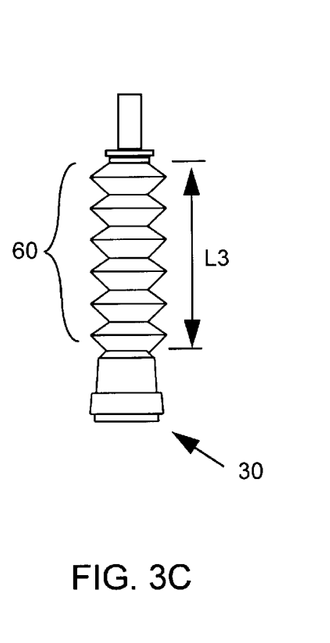

Referring to FIGS. 3A, 3B and 3C, the flexible portion 60 of a bellows 30 prior to testing is compressed from a first position near full height (wherein the flexible portion has a length L1) to a second position which generally is slightly compressed as could be found after assembly of a bellows into a fixture such as a bellows pump (wherein the flexible portion has a length L2), and the force needed to compress the flexible portion of the bellows from length L1 to length L2 is recorded as compression force F1. The compressed bellows is held at the second position while in contact with (submerged in) a test solution at a fixed temperature for a period of time. The test solution can be air, or can be an aggressive chemical environment for the thermoplastic of interest. After the period of time, the compressed bellows is removed from the test solution and removed from compression, and allowed to expand to an unrestrained length and return to room temperature, wherein the flexible portion of the unrestrained bellows will achieve a length L3. The force needed to again compress the flexible portion of the bellows from length L3 back to length L2 at room temperature is recorded as compression force F2. Alternatively, the article can be returned to the compressed second position (L2) and placed into the environment for additional periods of time. The ratio of F2 to F1 (or F2/F1) is the Compression Force Residual (CFR) for the bellows tested. The Compression Set Index (CSI) of the irradiated bellows is represented by the Equation 1:

$$CSI = \frac{(L1 - L3)}{(L1 - L2)} \times 100 \quad \text{(Equation 1)}$$

For the bellows 30 shown in FIG. 1, the flexible portion 60 of the bellows is compressed from a first position wherein length L1 is 1.41 inches (3.58 cm) to the second position wherein the length L2 is 1.23 inches (3.12 cm), and held in compression in the second position for a fixed time in the test solution at a fixed temperature. The test solutions used included air and Pantene™ Damage Care Treatment Shampoo, sold by Max Factor K. K. in Japan (December 1995). Results of the Compression Force Residual and Compression Set Index are recorded for both the irradiated bellows 30 and the non-irradiated bellows in Table 1-C and Table 1-D, respectively.

TABLE 1-C

Fatigue Index and Compression Force Ratio

| Dose (Mrad) | Test Environment | Fatigue Index | F1 (+/−0.2 lbs.) | F2 @ 16 weeks (+/−0.2 lbs.) | Compression Force Residual - CFR |
|---|---|---|---|---|---|
| 0 | air | 1 | 1.85 | 0.83 | 0.449 |
| 25 | air | 1 | 2.15 | 1.17 | 0.544 |
| 0 | Pantene ™ | 5 | 1.88 | 0.20 | 0.106 |
| 25 | Pantene ™ | 1 | 2.19 | 0.72 | 0.329 |

TABLE 1-D

Compression Set Index

| Dose (Mrad) | Test Environment | L1 (+/−0.02 in) | L3 (+/−0.02 in) | Compression Set Index - CSI (L2 = 1.23 inches) |
|---|---|---|---|---|
| 0 | air | 1.45 | 1.35 | 45.5 |
| 25 | air | 1.50 | 1.39 | 40.7 |
| 0 | Pantene ™ | 1.47 | 1.28 | 79.2 |
| 25 | Pantene ™ | 1.50 | 1.34 | 59.3 |

From Table 1-C, for bellows treated in air after 16 weeks at 70° F., the Compression Force Residual (CFR) for the non-irradiated bellow is 0.449, while the CFR for irradiated bellows is 0.544. The improvement in CFR in air due to irradiation is 21%. For bellows treated in the Pantenem shampoo after 16 weeks, the CFR for the non-irradiated bellows is 0.106, while the CFR for irradiated bellow is 0.329. The improvement in CFR in the Pantene™ due to irradiation is 210%.

Example 2

An ethylene-co-vinyl acetate copolymer having a MFI of 30 and containing 19% by weight vinyl acetate (UE652-059 made by Quantum Chemical Co.) was injection molded into pleated bellows as shown in FIG. 1, by the method as described in Example 1. Irradiated bellows received total accumulated dosages of 3, 7, 12, 15, and 25 Mrad from a direct electron accelerator, as described in Example 1. The results of environmental fatigue testing are shown in Table 2-A for bellows tested in the Pantene™ Damage Care Treatment shampoo of Example 1, and in Comet™ Pine Bathroom Cleaner, sold by The Procter & Gamble Company (December, 1995).

TABLE 2-A

| | Fatigue Index | |
|---|---|---|
| Dosage (Mrad) | Pantene ™ Shampoo - Japan | Comet ™ Pine Bathroom Cleaner - U.S. |
| 0 | 4 | 5 |
| 3 | 1 | 1 |
| 7 | 1 | 1 |
| 12 | 1 | 1 |
| 15 | 1 | 1 |
| 25 | 1 | 1 |

Referring now to FIGS. 4A and 4B, the Environmental Stress Cracking Resistance (ESCR) test is conducted by compressing a flexible portion of a bellows from a first position near full height wherein the length of the flexible portion is L1, to a second compressed position near the end of a full stroke, wherein the length of the flexible portion is L2. The compressed flexible portion of the bellows is held in a static compressed state while immersed in a test solution consisting of a harsh chemical environment of interest. The assembly is then transferred to a 100° F. constant temperature room or oven. At predetermined time periods, the flexible portion is removed from the test solution which is still held under compression. If no cracks are observed in the compressed flexible portion, the bellows sample is again submerged into the test solution at the 100° F. constant temperature. The total time at which a crack is first observed in a bellows is reported as the failure time, and the test is terminated.

For the bellows as shown in FIG. 1, the flexible portion 60 of the bellows is compressed from a first position wherein length L1 is 1.41 inches (3.581 cm) to the second position wherein the length L2 is 0.77 inches (1.956 cm), and submerged into one of the Pantene™ Damage Care Treatment Shampoo of Example 1, or the Comet™ Pine Bathroom Cleaner. The average time for the failure of four bellows tested in each of the test solutions is listed in Table 2-B.

TABLE 2-B

| | ESCR (hours) | |
|---|---|---|
| Dosage (Mrad) | Pantene ™ Shampoo - Japan of Example 1 | Comet ™ Pine Bathroom Cleaner |
| 0 | 2 | 2 |
| 25 | >1000 | >1000 |

Example 3

Irradiated and non-irradiated bellows made as described in Example 1 separately from two ethylene methyl acrylate (EMA) copolymers and from one very low density polyethylene (VLDPE). The EMA resins were SP2220 and SP2207, purchased from Chevron Chemical Co. These resins have methyl acrylate weight percentages of 20 wt % and melt flow indices of 20 and 6, respectively. The VLDPE utilized was obtained from Enichem Chemical Co. of Italy (MFI of 13), and sold under the tradename MQFO. The Environmental Fatigue Resistance Index (determined in accordance with the method described in Example 1a) of these bellows when tested in the Vidal Sassoon™ Shampoo described in Example 1-A are shown in Table 3.

TABLE 3

| | Fatigue Index | | |
|---|---|---|---|
| Dosage (Mrad) | SP2220 | SP2207 | MQFO |
| 0 | 4.0 | 2.0 | 2.25 |
| 25 | 1.0 | 1.0 | 1.0 |

The above examples illustrate how the properties of molded articles comprised of properly chosen thermoplastic radiation-crosslinkable resins that are loaded in cyclic or static states of stress are enhanced by irradiation. Enhanced properties include but are not limited to ESCR, environmental resistance fatigue and compression set resistance. Other properties that can also be enhanced include but are not limited to heat, chemical, and abrasion resistance. Articles as described herein include, but are not limited to, bellows used for pumping or dispensing of fluids, such as aqueous based fluids. Another example application for an irradiated flexible article includes but, is not limited to a protective boot such as used in an automotive application. Thus, irradiated crosslinkable thermoplastic materials can provide for long service lives of these and other articles loaded in cyclic and static states of stress while exposed to aggressive chemical environments.

Example 4

In this example, planar thermoplastic films are made and tested, as opposed to non-planar articles. Thirty parts by weight of an ethylene vinyl acetate (EVA) copolymer containing 9 weight % vinyl acetate and having a sharp melting point of 99.5° C., is blended with 70 parts by weight of an EVA containing 28 weight % vinyl acetate and having a broad melting point in the range from 35° C. to 65° C., to form an EVA having 22.3% vinyl acetate and having a low modulus and creep resistance.

Steady state creep for a planar film of EVA material is measured in a Perkin Elmer DMA7 in creep recovery mode at $1 \times 10^5$ Pa constant stress at 50° C. The steady state creep for the 22.3 wt. % vinyl acetate EVA physical blend film ($7.4 \times 10^{-4}$%/min.) is higher than that of a 19 wt. % vinyl acetate EVA film ($5.0 \times 10^{-4}$%/min.).

However, after radiation induced crosslinking at 25 Mrads total accumulation in accordance with the procedure of Example 1, the steady state creep of the radiated 22.3 wt. % vinyl acetate EVA physical blend film ($3.2 \times 10^{-4}$%/min.) is approximately equivalent to that of the irradiated 19 wt. % vinyl acetate EVA film ($3.4 \times 10^{-4}$%/min.).

While the present invention has been illustrated by reference mainly to a bellows, it is to be understood that the present invention is not so limited, but is to encompass any type of non-planar thermoplastic article having a flexible portion.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A process comprising:
   (a) forming a thermoplastic into a first non-planar article having a flexible portion wherein the thermoplastic comprises at least one copolymer of an alpha-olefin and either an ethylenically unsaturated carboxylic ester or an alkyl acrylate; and
   (b) exposing the first non-planar article to an amount of radiate energy to from a treated non-planar article having a flexible portion, wherein the treated article has improved mechanical service in an aggressive chemical environment.

2. The process of claim 1 wherein the amount of radiate energy ranges from about 1 to about 35 Mrad.

3. The process of claim 2 wherein the temperature of the thermoplastic during exposing is less than the melting point of the thermoplastic.

4. The process of claim 1 wherein the flexible portion is non-planar.

5. The process of claim 1 wherein the flexible portion of the treated non-planar article has a Young's modulus of less than about 100,000 psi.

6. The process of claim 5 wherein the Young's modulus is in the range of about 2,000 to about 50,000 psi.

7. The process of claim 1 wherein the thermoplastic is selected from the group of thermoplastics consisting of ethylene methyl acrylate, ethylene ethyl acrylate, and ethylene vinyl acetate copolymers, wherein the amount of radiate energy ranges from about 5 to about 25 Mrad, wherein the flexible portion is non-planar, wherein the temperature of the thermoplastic during exposing is less than the melting point of the thermoplastic, and wherein the flexible portion of the treated article has a Young's modulus in the range of about 3,000 to about 12,000 psi.

8. The process of claim 7 wherein the treated non-planar thermoplastic article is a bellows.

9. A process comprising:
   (a) exposing a thermoplastic, wherein the thermoplastic comprises at least one copolymer of an alpha-olefin and either an ethylenically unsaturated carboxylic ester or an alkyl acrylate, to an amount of radiate energy to form a treated thermoplastic; and
   (b) forming the treated thermoplastic into a treated non-planar thermoplastic article having a flexible portion, wherein the treated article has improved mechanical service in an aggressive chemical environment.

10. The process of claim 9 wherein the thermoplastic is selected from the group of thermoplastics consisting of, ethylene methyl acrylate, ethylene ethyl acrylate, and ethylene vinyl acetate copolymers, wherein the radiate energy ranges from about 5 to about 35 Mrad, wherein the flexible portion is non-planar, wherein the temperature of the thermoplastic during exposing is less than the melting point of the thermoplastic, and wherein the Young's modulus of the flexible portion is in the range of about 3,000 to about 12,000 psi.

11. A non-planar article comprising a flexible portion, the flexible portion comprising an irradiated thermoplastic, wherein the irradiated thermoplastic comprises at least one copolymer of an alpha-olefin and either an ethylenically unsaturated carboxylic ester or an alkyl acrylate.

12. The article of claim 11 wherein the flexible portion comprises at least one selected from the group consisting of a coil, fold, bend, bow, twist and curve.

13. The article of claim 11 wherein the flexible portion comprises a spring or pleat.

14. The article of claim 11 comprising a bellows.

15. The article of claim 11 wherein the flexible portion is molded.

16. The article of claim 11 wherein the irradiated thermoplastic of the flexible portion has a Young's modulus less than about 100,000 psi.

17. The article of claim 16 wherein the Young's modulus of the flexible portion is in the range of about 2,000 to about 50,000 psi.

18. The article of claim 11 wherein the flexible portion is molded and comprises a spring or a pleat, wherein the irradiated thermoplastic of the flexible portion has a Young's modulus in the range of about 3,000 to about 12,000 psi, and wherein the thermoplastic is selected from the group of thermoplastics consisting of ethylene methyl acrylate, ethylene ethyl acrylate, and ethylene vinyl acetate copolymers.

19. Non-planar article comprising a potential energy storage section comprising an irradiated thermoplastic, wherein the irradiated thermoplastic comprises at least one copolymer of an alpha-olefin and either an ethylenically unsaturated carboxylic ester or an alkyl acrylate, and wherein the section is suitable for cyclic movement between a position of lower potential energy, and another position of higher potential energy.

20. The article of claim 19 wherein the storage section is molded and comprises a spring or a pleat, wherein the irradiated thermoplastic of the storage section has a Young's modulus in the range of about 3,000 to about 12,000 psi, and wherein the thermoplastic is selected from the group of thermoplastics consisting of polyethylene, ethylene methyl acrylate, ethylene ethyl acrylate, and ethylene vinyl acetate copolymers.

* * * * *

UNITED STATES PATENT AND TRADEMARK OFFICE
CERTIFICATE OF CORRECTION

PATENT NO.    : 5,855,985
DATED         : January 5, 1999
INVENTOR(S)   : Hugh J. O'Donnell It is certified that error appears in the above-identified patent and that said Letters Patent is hereby corrected as shown below:

Claim 7,
Line 65, please delete "a container outlet" and insert therefore -- a container adjacent a container outlet --.
Line 5, please delete "in the" and insert therefore -- in which the --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*